United States Patent [19]

Gay et al.

[11] Patent Number: 4,733,762
[45] Date of Patent: Mar. 29, 1988

[54] COUPLABLE/DECOUPLABLE CLUTCH RELEASE BEARING ASSEMBLY

[75] Inventors: Christian Gay, Paris; Philippe Lassiaz, Boulogne, both of France

[73] Assignee: Valeo, Paris, France

[21] Appl. No.: 916,805

[22] Filed: Oct. 8, 1986

[30] Foreign Application Priority Data

Oct. 9, 1985 [FR] France ............................. 85 14934

[51] Int. Cl.⁴ ............................................. F16D 23/14
[52] U.S. Cl. ................................. 192/98; 192/110 B; 192/DIG. 1
[58] Field of Search .................... 192/98, 70.13, 89 B, 192/110 B, DIG. 1

[56] References Cited

U.S. PATENT DOCUMENTS

| 4,228,882 | 10/1980 | Huber et al. | 192/98 |
| 4,399,898 | 8/1983 | Olschewski et al. | 192/98 |
| 4,405,041 | 9/1983 | Broadbent | 192/98 |
| 4,502,583 | 3/1985 | Limbacher | 192/98 |
| 4,529,075 | 7/1985 | Renaud | 192/98 |
| 4,560,053 | 12/1985 | Lassiaz | 192/98 |
| 4,588,061 | 5/1986 | Mallet | 192/98 |
| 4,613,027 | 9/1986 | Lassiaz et al. | 192/89 B |
| 4,632,237 | 12/1986 | Maycock et al. | 192/98 |
| 4,646,897 | 3/1987 | Winters | 192/98 |
| 4,646,898 | 3/1987 | Muller | 192/98 |
| 4,648,499 | 3/1987 | Despres et al. | 192/98 |

FOREIGN PATENT DOCUMENTS

| 110602 | 6/1984 | European Pat. Off. | |
| 2304826 | 10/1976 | France. | |
| 2508125 | 12/1982 | France. | |
| 2062799 | 5/1981 | United Kingdom. | |
| 2098697 | 11/1982 | United Kingdom | 192/70.13 |

Primary Examiner—Rodney H. Bonck
Assistant Examiner—Richard M. Lorence
Attorney, Agent, or Firm—Charles E. Brown; Charles A. Brown

[57] ABSTRACT

A clutch release bearing assembly comprises a coupling part adapted to couple a clutch release bearing to a clutch release device of a clutch. The coupling part is attached to the clutch release device. A drive part forms part of the clutch release bearing and there is an annular retaining groove on the coupling part or the drive part. A fastening device operative in traction between the coupling part and the drive part couples these parts together in the axial direction from the clutch release device to the clutch release bearing. The fastening device comprises an annular coupling member which is elastically deformable in the radial direction and at least partly engaged in the annular retaining groove. It further comprises a substantially transverse drive bearing surface on the other (coupling or drive) part, on which the coupling member bears axially in the axial direction in question. There is a groove in the same part as the drive bearing surface. An annular decoupling member is adapted to decouple the clutch release bearing from the clutch release device of the clutch. It is movable axially in the previously mentioned groove, of one flank of which the drive bearing surface forms part. The coupling member is carried by the coupling part. The decoupling member is carried by the drive part. The decoupling member comprises engagement means adapted to couple it releasably to the coupling member in at least the axial direction from the clutch release device to the clutch release bearing.

16 Claims, 16 Drawing Figures

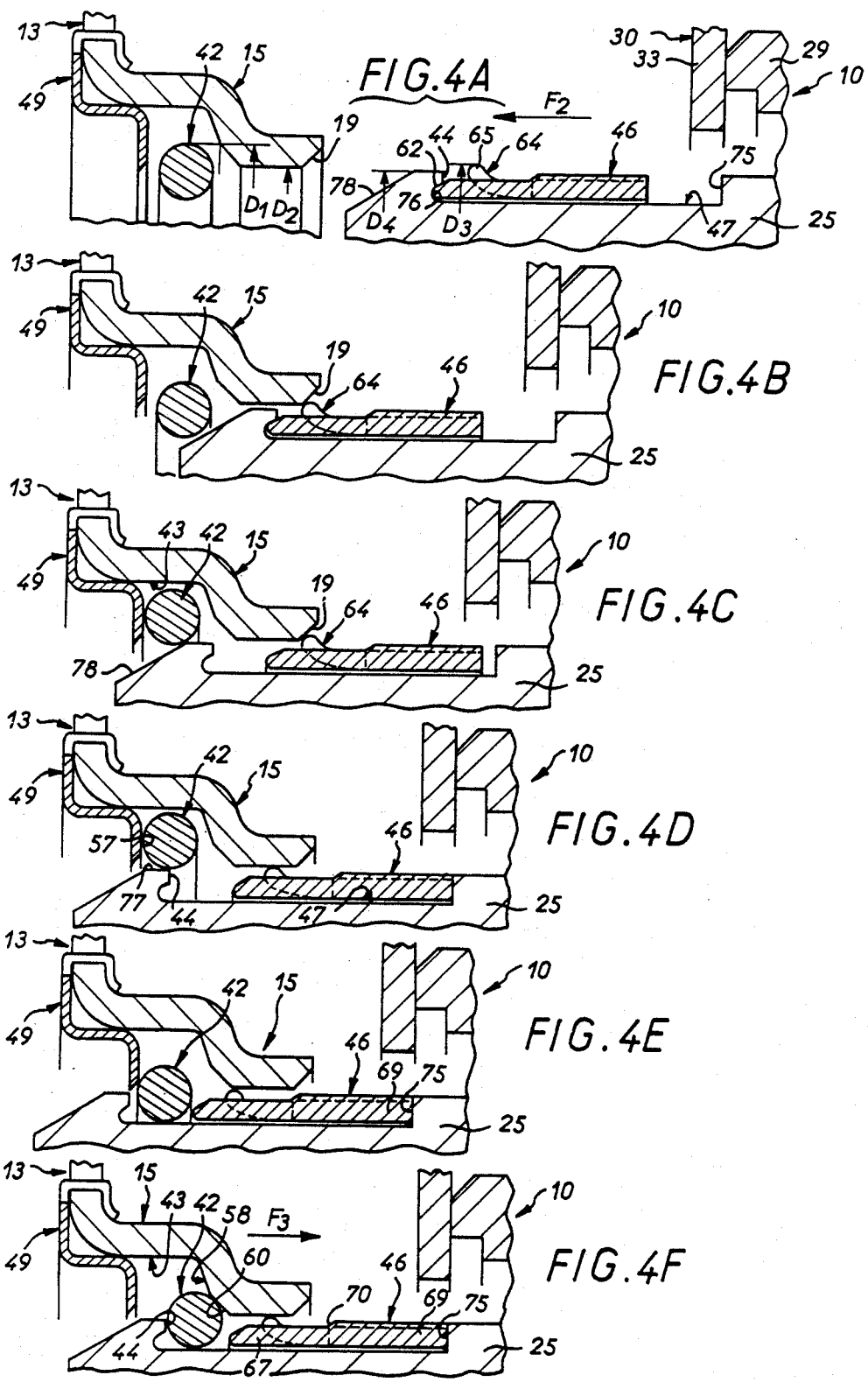

COUPLABLE/DECOUPLABLE CLUTCH RELEASE BEARING ASSEMBLY

BACKGROUND OF THE INVENTION

1. Field of the Invention

The present invention is generally concerned with clutch release bearings, in particular those for automobile vehicles.

It is more particularly directed to so-called "pull" type clutch release bearings which are designed to operate in traction on the clutch release device of the clutch to be operated and which are coupled to this device for this purpose.

2. Description of the prior art

In some clutch release bearing assemblies, and in particular in the clutch release bearing assembly described in French Pat. No. 2 304 826 and that described in U.S. Pat. No. 4,648,499 commonly assigned with this invention it has been proposed to use between the clutch release bearing and the clutch release device to be operated, in order to couple the clutch release bearing to the clutch release device, a part referred to hereinafter for convenience only as the "coupling part" or "action part" which, appropriately attached to the clutch release device, comprises on the side of the latter opposite the clutch release bearing a radial bearing flange through which it is adapted to operate on it, in cooperation with fastening means operative in traction between a coupling part of this kind and a part referred to hereinafter for convenience only as the "drive part" forming part of the clutch release bearing, adapted to provide an axial coupling between said parts in the axial direction from the clutch release device to the clutch release bearing.

In the above-mentioned French patent and U.S. patent the fastening means operative in traction employed generally comprise an annular coupling member which is elastically deformable in the radial direction, such as a simple ring, for example, and which is at least partially inserted radially into an annular retaining groove formed for it on either of the parts to be fastened together in traction, and a substantially transverse drive bearing surface on the other of these parts with which said coupling member cooperates in axial bearing engagement in the axial direction corresponding to the required axial coupling.

A particular advantage of an arrangement such as this is that it enables the clutch release device of the clutch to be operated to be fitted with the coupling part in advance, even before the corresponding clutch cover assembly is put together, and then, at the final assembly stage, the clutch release bearing to be engaged with the coupling part and thus with the clutch release device, by means of a simple clipping action.

Although the required coupling between the clutch release bearing and the clutch release device of the clutch to be operated is thus very easily procured, this does not apply for the converse process, meaning the process necessary to decouple the clutch release bearing and the clutch release device.

Failing other measures, it is normally necessary to demount the clutch beforehand in order to gain access from the front, that is to say from the clutch release device side, to the coupling member in order to be able to cause it to retract elastically to achieve the necessary decoupling.

To overcome this difficulty it is proposed in the aforementioned U.S. patent to use a mobile part to delimit the retaining groove; this so-called decoupling part, which is in the form of a bush, is normally spaced axially from the coupling member and it is sufficient to displace it axially towards the coupling member to expel it from the retaining groove and so bring about the necessary decoupling.

Although it has proven satisfactory, an arrangement of this kind does raise problems.

In particular, a tool is needed for maneuvering the decoupling part, which makes this maneuver relatively difficult.

In the European patent application filed Nov. 10, 1983 under the No. 83306880.2 and published under the No. 0 110 602 there is described an arrangement with which, both for decoupling and coupling, it suffices to procure appropriate axial movement of the clutch release bearing relative to the clutch release device of the clutch to be operated, the axial movement to be applied to the clutch release bearing in this way being very simple to apply blind using a control member, in practice a clutch release yoke, usually associated with it.

Using this arrangement there is associated with the coupling member an annular decoupling member which is fitted in advance to that of the parts to be fastened together in traction which comprises the drive bearing surface, at a distance from this surface, and with which said coupling member may become engaged as a result of sufficient axial movement of the clutch release bearing in the axial direction away from the bearing surface, provided that the coupling member is stressed.

The coupling member having been stressed by the decoupling member in this way, it entrains the decoupling member with it when the clutch release bearing is again subjected to an axial displacement in the axial direction towards the drive bearing surface but, because of the fact that it is stressed, it then escapes from this drive bearing surface which brings about the necessary decoupling.

However, being entrained by the coupling member, in this same movement the decoupling member itself escapes from the part to which it was initially fitted and recoupling becomes impossible unless the decoupling member is first detached from the coupling member and both these members returned to their initial position, or new members substituted for them, which entails operations that are particularly difficult to carry out.

On vehicle assembly lines it may be advantageous to be able to carry out recoupling after decoupling, however.

After coupling the clutch release bearing to the clutch release device of the clutch to be equipped, other assembly operations are carried out on such assembly lines, for example the fitting of the clutch cable controlling the assembly, and during such operations accidental action on the clutch release yoke may inadvertently decouple the clutch release bearing.

In the commonly assigned French patent application No. 85 09883 filed June 28, 1985 and published on Apr. 3, 1987, under Publication No. 2,588,051, there is proposed an arrangement permitting reversible coupling and/or decoupling to be carried out in a particularly simple and advantageous manner.

Using this arrangement there is associated with the coupling member, as previously, an annular decoupling member but this decoupling member is mounted to be movable axially in a groove from which it cannot escape.

The groove is formed in that of the parts to be fastened together in traction which comprises the drive bearing surface and the drive bearing surface forms part of one its flanks.

The decoupling member conjointly features a frustoconical bearing surface which diverges radially from the bottom of the groove in which it is disposed in the direction towards the drive bearing surface and the circumference of which axially nearest the drive bearing surface is at least level with the circumference forming the free edge of the latter.

When decoupling is required, it is sufficient, as previously, to operate on the clutch release bearing in such a way that the coupling member becomes engaged with the decoupling member.

However, this engagement of the coupling member with the decoupling member is obtained through the frustoconical bearing surface of the latter so that when the clutch release bearing is again moved axially in the axial direction towards the drive bearing surface, in order to bring about the necessary decoupling, the decoupling member which butts up against the drive bearing surface causes, through its frustoconical bearing surface and while remaining in place within the part to which it is fitted, sufficient retraction of the coupling member for the latter to escape from the decoupling member and the drive bearing surface and thus from the part comprising this drive bearing surface.

The decoupling member having remained in place, recoupling is possible.

The arrangement described in French patent application No. 85 09883 is suited only to the case where the coupling member is of one of the types described in the aforementioned French Pat. No. 2 304 826, that is to say to the case where this coupling member comprises a substantially frustoconical washer which has one of its edges engaged in the associated retaining groove and features along its other edge, substantially aligned with it, lugs through which it is adapted to cooperate in axial bearing engement with the drive bearing surface and lugs which, disposed at an angle to the aformentioned lugs, are also engaged in the retaining groove, on the side opposite the substantially frustoconical washer from which they originate.

It is not suited or not so well suited to the case where the coupling member is a simple ring, that is to say the case where the coupling member is in the form of a torus, for example in the form of a torus of circular transverse cross-section.

This is all the more so in that, with this arrangement, there is a simple bearing contact between the coupling member and the decoupling member when these two members are interlocked with each other.

Before the decoupling member butts up against the drive bearing surface, which is necessary for it to then bring about the required deformation of the coupling member, once it has been stopped in this way, it must itself be entrained by the coupling member in the direction towards the drive bearing surface.

If, as in this instance, the decoupling member features an edge through which it is interlocked with the decoupling member, the entrainment that is required beforehand can be securely obtained.

This is not necessarily so in the case of a simple ring, because of the rounded contour of the surface through which it then bears on the decoupling member.

Likewise, in French patent application No. 85 09883 there is no specific provision for the decoupling member to be axially pushed back away from the drive bearing surface when coupling takes place so as not to impede the interlocking of the coupling member with this drive bearing surface.

There may result some degree of uncertainty as to the functioning of the parts in question when coupling takes place, and in particular a certain delay in the actual effecting of such coupling, which may entail maneuvering the clutch release bearing a number of times unless, as in this instance, the coupling member is of a specific type adapted to bring about the necessary entrainment of the decoupling member in all circumstances.

Although this French patent application No 85 09883 provides for the coupling member to be carried by the drive part of the clutch release bearing or by the coupling part, the decoupling member being carried either by the coupling part or by the drive part, it has since become clear that the arrangement whereby it is the drive part of the clutch release bearing that carries the decoupling member is particularly advantageous.

For example, other things being equal it is possible to make the decoupling member longer in the axial direction because the axial space available on the drive part of the clutch release bearing is usually greater than that available on the coupling part, the latter itself having a relatively restricted axial length.

Given its greater axial length, the conditions under which the decoupling member slides on the part which carries it are improved, which minimizes the risk of it jamming on the latter.

The increased axial length of the decoupling member is not achieved at the cost of any corresponding increase in the overall axial size of the drive part and thus of an increase in the overall axial size of the assembly, the drive part itself already having sufficient axial length, given the insertion travel that it must undergo relative to the coupling part when coupling takes place, all the more so in that, as a safety measure, this travel is usually increased by an overtravel and an overtravel of this kind is also necessary when decoupling takes place.

To give the decoupling member the necessary axial length use may be made of the space usually left in the radial direction between the drive part of the clutch release bearing and the coupling means, for example a cover, axially coupling the drive member of which the drive part forms part to the maneuvering member adapted to control the assembly within the clutch release bearing.

Another advantage of the arrangement whereby the decoupling member is carried by the clutch release bearing is that the radial space which has to be provided on the corresponding drive part to permit intervention by the coupling member and which is in practice formed by the groove provided on this drive part for the decoupling member is significantly less than that which has to be provided when it has to carry the coupling member since in this case this member also has to be able to retract virtually entirely.

In the former case this space is in the order of half the radial thickness of the coupling member and in the latter case it is in the order of virtually the entire thickness.

Other things being equal, the drive part of the clutch release bearing can therefore be of smaller diameter and as it is in practice formed by one of the races of a ball bearing this results in a non-negligible saving in that the cost of a ball bearing is usually proportional to its average diameter.

Finally, using the arrangement whereby the decoupling member is carried by the drive part of the clutch release bearing the decoupling member may be fitted to the drive part either by virtue of simple elasticity or by means of a radial slit provided in it for this purpose, given that fitting it entails a temporary increase in the diameter of the decoupling member, rather than a decrease.

The arrangements may then, with advantage, be such that, with the decoupling member in place on the drive part of the clutch release bearing, there is provided between the decoupling member and the clutch release bearing an annular clearance favorable to good sliding conditions and thus to good functioning of the assembly, without there being any risk of this clearance being reduced or eliminated as a result of the radial retraction to which the decoupling member is subjected by the coupling member when it is interlocked with the latter.

For example, if the decoupling member is split radially by a slit it is sufficient for the two lips of the slit to be in contact with each other when it is in place on the drive part of the clutch release bearing.

A general object of the present invention is a clutch release bearing assembly advantageously employing an arrangement of this kind whereby the decoupling member is carried by the drive part of the clutch release bearing and advantageously exempt of the disadvantages briefly described above.

SUMMARY OF THE INVENTION

The present invention consists in a clutch release bearing assembly comprising a coupling part which is adapted to couple a clutch release bearing to a clutch release device of a clutch and which is attached to the clutch release device, a drive part forming part of the clutch release bearing, an annular retaining groove on one of the coupling and drive parts, fastening means operative in traction between the coupling part and the drive part and adapted to couple the parts together in the axial direction from the clutch release device to the clutch release bearing, the fastening means comprising an annular coupling member which is elastically deformable in the radial direction and at least partly engaged in the annular retaining groove and a substantially transverse drive bearing surface on the other of the coupling and drive parts on which the coupling member bears axially in the axial direction in question, a groove in the same part as the drive bearing surface, and an annular decoupling member which is adapted to decouple the clutch release bearing from the clutch release device of the clutch, which is movable axially in the groove, of one flank of which the drive bearing surface forms part, in which assembly the coupling member is carried by the coupling part, the decoupling member is carried by the drive part, and the decoupling member comprises engagement means adapted to couple it releasably to the coupling member in at least the axial direction from the clutch release device to the clutch release bearing.

By the term engagement means there is meant in this case means entailing some degree of relative nesting between the coupling member and the decoupling member when these members are interlocked with each other, as distinguished from a simple bearing engagement between such members as in the French patent application No 85 09883 mentioned hereinabove.

An advantageous result of this is that when decoupling takes place the entrainment of the decoupling member by the coupling member which is needed to bring about such decoupling is securely obtained, even if the coupling member is a simple ring, it being understood that although the object of the present invention is specifically related to the case where the coupling member is formed by a simple ring in this way, this is not necessarily the case.

For example, the engagement means in accordance with the invention may be formed by an annular groove on the outside periphery of the decoupling member which has a profile at least partly complementary to that of the coupling member.

However, in one preferred embodiment they are formed by a plurality of tangs, hereinafter referred to for convenience as axial drive tangs, that the decoupling member features and which are elastically deformable in the radial direction with, in the unstressed condition, a free end projecting from the outside periphery of the decoupling member, each drive tang itself having in the vicinity of its free end an axial profile at least in part complementary to that of the coupling member.

A drive tang of this kind advantageously has a two-fold function:

On the one hand, when decoupling takes place, it secures the necessary entrainment of the coupling member by the decoupling member; on the other hand, when coupling takes place it secures appropriate positioning of the decoupling member in the groove in which it is disposed, to this end cooperating temporarily abutment fashion with the corresponding edge of the coupling part.

It is to be understood that, with the same objective in view, a drive tang of this kind must also be provided in the case where the engagement means in accordance with the invention comprise a groove.

However, in this case it advantageously extends axially at a distance from the groove so as not to interfere with it and to prevent the coupling member being forced out of it.

The characteristics and advantages of the invention will emerge from the following description given by way of example only and with reference to the appended diagramatic drawings.

BRIEF DESCRIPTION OF THE DRAWINGS

FIGS. 4A through 4F are views analogous to that of FIG. 2 illustrating the coupling of the clutch release bearing concerned with the coupling part carried by the clutch release device of the clutch to be operated.

DESCRIPTION OF THE PREFERRED EMBODIMENT

The embodiment shown in FIGS. 1 through 5 will now be described.

Figure 1:
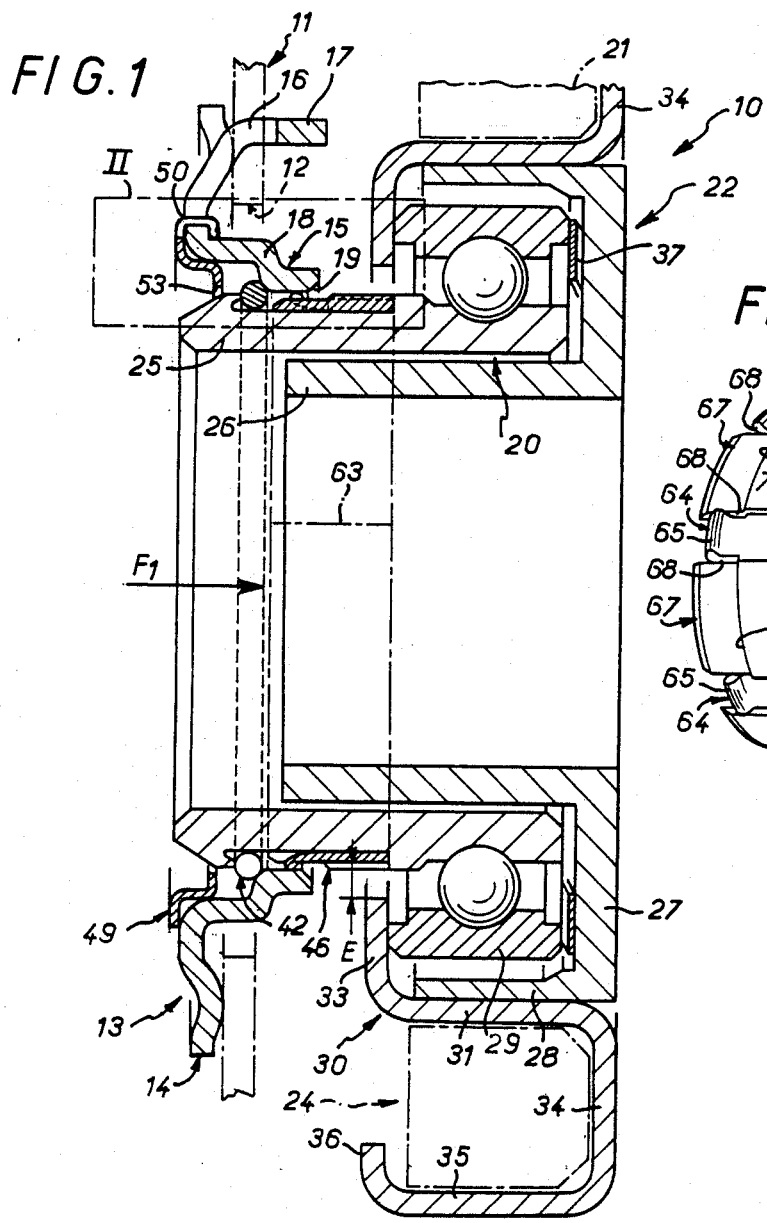
FIG. 1 is a partial view in axial cross-section of a clutch release bearing assembly in accordance with the invention.
Figure 3:
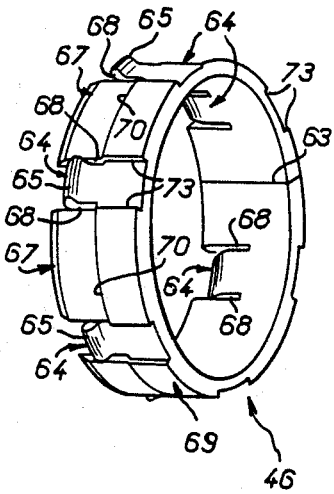
FIG. 3 is a view to a different scale and in perspective of the decoupling member used in the clutch release bearing assembly shown in isolation.

As shown by FIG. 1, the object is to couple a clutch release bearing 10 to the clutch release device 11 of any form of clutch to be operated.

The clutch release device 11, which is shown only schematically in FIG. 1 in chain-dotted line, is, in a manner which is known per se, formed by the ends of radial fingers of a diaphragm spring, meaning an annular member which, forming part of the clutch to be operated, comprises a circumferentially continuous peripheral part forming a Belleville washer, for urging the clutch towards an engaged condition, and a central part divided by slots into radial fingers, namely the radial finger just mentioned, to constitute levers adapted to operate the clutch release device to disengage the clutch.

In a manner also known per se, for the purpose of coupling the clutch release bearing 10 to the clutch release device 11, which is necessary for the clutch release device 11 to operate in traction on the clutch release bearing 10, there is attached to the clutch release device, by means of its central opening 12, a part 13 referred to hereinafter for convenience as the coupling part.

This coupling part, or action part, is of the type described in U.S. Pat. No. 4,613,027, commonly assigned with this invention.

As a coupling part of this kind does not of itself constitute part of the present invention it will not be described in detail here.

It will suffice to mention that, on the side of the clutch release device 11 opposite the clutch release bearing 10, it comprises a radial flange 14 called the bearing flange for action on a clutch release device 11 of this kind, the bearing flange being appropriately profiled to this end, and that it comprises in one piece with the bearing flange 14, at its inside edge, a bush 15 which extends substantially axially through the clutch release device 11 by means of the central opening 12 therein, and at its outside edge spaced lugs 16 which also pass axially through the clutch release device 11, each passing between two adjacent radial fingers of the latter, and each carrying cantilever fashion a circumferentially projecting retaining finger 17 at their end, in line with the bearing flange 14 and substantially parallel thereto, the retaining finger 17 being adapted to secure, in cooperation with the bearing flange 14, axial retention of the assembly to the clutch release device 11.

As described in the aforementioned U.S. Pat. No. 4,613,027, a coupling part 13 of this kind is fitted to the clutch release device 11 by means of a bayonet type coupling: when the coupling part 13 and the clutch release device 11 have been brought sufficiently close together, the end of each of the radial fingers of the clutch release device 11 over which has to be circumferentially engaged the retaining finger 17 of the lugs 16 on the coupling part 13 is bent axially relative to the others, and the coupling part 13 is then rotated about the axis of the assembly relative to the clutch release device 11 so that such engagement becomes effective and the previously bent radial fingers of the clutch release device 11 are then released.

For reasons that will emerge hereinafter, the axial bush 15 of the coupling part 13, which is of appropriately shaped sheet metal, features in its median area between two substantially rectilinear sections a step 18, that of its rectilinear sections axially farther away from its bearing flange 14 having an overall diameter less that that of the other.

At its free end, meaning at the free end of its smaller diameter rectilinear section, it is bevelled on its inside edge and so forms, for reasons that will also emerge hereinafter, a frustoconical engagement bearing surface 19.

The clutch release bearing 10 does not of itself form part of the present invention, either.

In the manner that is known per se, it comprises a drive member 20 through which it is adapted to operate on the clutch release device 11, through the intermediary of the coupling part 13, as described in detail hereinafter, a maneuvering member 22 through which it is adapted to be mounted so as to be slidable axially on any form of guide member, not shown, and coupling means which fasten the drive member 20 to the maneuvering member 22 in the axial direction and by means of which, as schematically represented in chain-dotted line in FIG. 1, it is also adapted to be operated by a control member 24 consisting of a clutch release yoke with fingers or arms 21.

The drive member 20 consists of a ball bearing.

For cooperation with the coupling part 13, it comprises a part 25 hereinafter referred to for convenience as the drive part.

The drive part 25 consists of the inner race of this ball bearing, sufficiently lengthened in the axial direction towards the clutch release device 11 for this purpose.

This inner race is appropriately machined from the solid.

The maneuvering member 22 comprises an axial sleeve 26 through which it is adapted to be slidably engaged on the associated guide member and a transverse annular flange 27 at the end of the sleeve 26 opposite the drive member 20 adapted to cooperate with the latter.

At its periphery the annular flange 27 carries a ring 28 projecting axially, coaxially with and in the same direction as the sleeve 26, surrounding the outer race 29 of the ball bearing constituting the drive member 20.

As the clutch release bearing is of the maintained self-centering type, annular clearance is provided between the ring 28 and the ball bearing constituting the drive member 20.

The fastening means which couple the drive member 20 to the maneuvering member 22 in the axial direction comprise a cover 30 which has a skirt 31 engaged without clearance over the ring 28 of the maneuvering member 22.

At the axial end of the skirt 31 on the same side of the assembly as the clutch release device 11 the cover 30 has an upstanding edge 33 directed towards the axis of the assembly against which bears the corresponding edge of the outer race 29 of the ball bearing constituting the drive member 20 but which, for reasons that will emerge hereinafter, terminates at a significant distance from the outer race of the latter, leaving between it and this outer race an annular gap E.

At the other axial end of the skirt 31 the cover 30 forms two arms 34 for the fingers or arms 21 of the control member 24 to act on, in diametrally opposed positions relative to each other and projecting radially away from the axis of the assembly.

For reasons that will emerge hereinafter each of the arms 34 has a right-angle lip 35 extending parallel to the axis of the assembly in the direction towards the clutch release device 11 and circumventing the arms or fingers 21 of the control member 24 and at the end of the right-angle lip 35 a lug 36 upstanding parallel to the arm and in the direction towards the axis of the assembly.

In FIG. 1 the right-angle lip 35 and the lug 36 are visible for only one of the arms 34 concerned.

It is to be understood that means for coupling the cover 30 to the maneuvering member 22 in the axial direction are provided between the cover 30 and the maneuvering member 22.

These may be clip means, for example, elastically deformable lugs being provided for this purpose in the ring 28 of the maneuvering member 22 to cooperate with openings also provided for this purpose in the skirt 31 of the cover 30.

These arrangements are well known in themselves, in particular from French patent No. 2 508 125, and as they do not of themselves form part of the present invention they will not be described in more detail here.

Since, as already mentioned, the clutch release bearing is of the maintained self-centering type, there are provided between the drive member 20 and the maneuvering member 22 axially acting elastic means consisting of a corrugated washer 37 of the type marketed under the trade name "ONDUFLEX".

The corrugated washer 37 bears on the annular flange 27 of the manuvering member 22 and on the corresponding edge of the outer race 29 of the ball bearing constituting the drive member 20, so as to urge this outer race against the upstanding edge 33 of the cover 30.

In the manner that is known per se there are provided between the drive part 25 of the clutch release bearing 10 and the coupling part 13 carried by the clutch release device 11 fastening means operative in traction adapted to procure axial coupling between these parts in the axial direction from the clutch release device 11 to the clutch release bearing 10, as schematically represented by the arrow F1 in FIG. 1.

The coupling part 13 comprises an axial bush 15 coaxial with the drive part 25 and the fastening means operative in traction are disposed between the bush 15 and the drive part 25.

To be more precise, the drive part 25 is engaged in the bush 15 of the coupling part 13 so that the fastening means operative in traction are operative between the outside periphery of the drive part 25 and the inside periphery of the bush 15.

Generally speaking, they comprise (see FIGS. 1 and 2) an annular coupling member 42 which is elastically deformable in the radial direction and which is at least partly inserted radially into an annular retaining groove 43 provided for it on one of the parts 13, 25 in question, and a substantially transverse drive bearing surface 44 provided on the other of the parts 13, 25 and with which it is adapted to cooperate in axial bearing engagement in the axial direction in question, which is that shown by the arrow F1 in FIG. 1.

Also in the manner that is known per se there is further provided a decoupling member 46 disposed and axially movable in a groove 47 formed for it on that of the parts 13, 25 which comprises the drive bearing surface 44 and of one flank of which the drive bearing surface 44 forms part.

In accordance with the invention, the coupling member 42 being carried by the coupling part 13 and the decoupling member 46 by the drive part 25 of the clutch release bearing 10, the decoupling member 46 comprises, as will be described in more detail hereinafter, engagement means adapted to permit it to be releasably coupled to the coupling member 42 at least for the axial direction from the clutch release device 11 to the clutch release bearing 10.

Thus the retaining groove 43 for the coupling member 42 is formed on the coupling part 13 and the groove 47 for the decoupling member 46 is formed on the drive part 25 of the clutch release bearing 10.

The retaining groove 43 is formed between the step 18 in the axial bush 15 of the coupling part 13 and a part 49 attached to the latter. The part 49 is simply hooked onto the coupling part 13 by means of lugs 50, on the side of the latter opposite the clutch release device 11, in the region of the bend formed between the bearing flange 14 and the axial bush 15, the lugs 50 passing through the bearing flange 14 by means of cut-outs formed in the latter in order to form the associated lugs 16, being bent into contact with its opposite side beyond these.

The part 49 is generally in the form of a cup the bottom 52 of which features a large central opening 53 the diameter of which is substantially the same as that of the inside periphery of the smaller diameter rectilinear section of the axial bush 15 of the coupling part 13; through its lateral wall 54 it is applied against the larger diameter rectilinear section of the axial bush 15; it is held against the bearing flange 14 by a lip 55 upstanding radially away from the axis of the assembly, extended from place to place by the lugs 50.

The bottom 52 of the part 49 extends radially towards the axis of the assembly and faces the step 18 in the axial bush 15.

It therefore forms the flank 57 of the retaining groove 43 which faces in the same axial direction as the drive bearing surface 44.

In other words, the flank 57 of the retaining groove 43 forms part of the part 49 which is distinct from the coupling part 13 but fastened to it.

The flank 57 is straight.

On the other hand, and for reasons that will emerge hereinafter, the other flank 58 of the retaining groove 43, meaning the flank which is formed by the step 18 in the axial bush 15 and is opposite the drive bearing surface 44, comprises, starting from the bottom of the retaining groove 43, a first frustoconical bearing surface 59 and, following on from this, a second frustoconical bearing surface 60 of smaller cone angle which extends to the inside periphery of the smaller diameter rectilinear section of the axial bush 15.

Thus on the side of the flank 58 the retaining groove 43 diverges outwardly from its bottom towards the outside periphery of the drive part 25.

The coupling member 42 is a simple ring.

In other words it is of generally toroidal shape and has a circular axial transverse cross-section.

The radial elasticity of the coupling member 42 results from a radial slit in it, the ring being formed simply by rolling a round wire, for example.

Alternatively, it may be inherent to the material of which it is made.

In the unstressed state (FIG. 4A) the coupling member 42 occupies a retracted configuration in which its outside diameter D1 is greater than that D2 of the inside periphery of the smaller diameter rectilinear section of the axial bush 15 of the drive part 13.

However, because of its elasticity it can assume a deployed configuration (see FIG. 4D, for example), in which it is inserted more deeply into the retaining groove 43.

The decoupling member 46 has the general shape of a relatively flat ring, that is to say a ring whose radial cross-section is elongate parallel to its axis.

On the side axially opposite the drive bearing surface 44 it has a straight transverse profile.

On the other hand, its axial end directed towards the drive bearing surface 44 is bevelled at its outside edge by a frustoconical engagement bearing surface 62.

Thus on the side of the drive bearing surface 44 the decoupling member 46 has a substantially triangular profile.

As with the coupling member 42, the radial elasticity of the decoupling member 46 results from a radial slit 63 provided in it.

However, it may instead be inherent to the material from which it is made.

Figure 2:
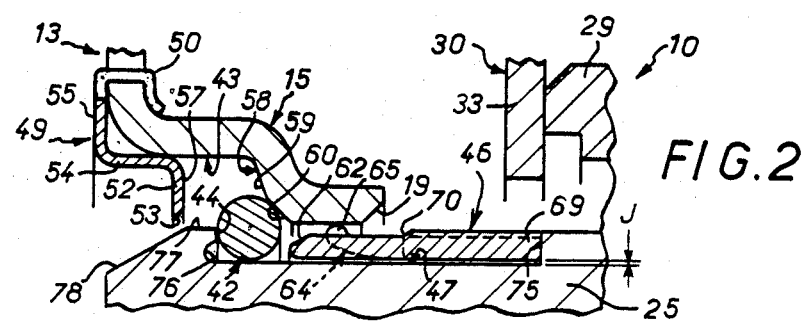
FIG. 2 shows to a larger scale the detail marked by the box II on FIG. 1.

In the unstressed state the lips of the slit 63 are preferably in contact with each other and there remains an annular clearance J between the decoupling member 46 and the bottom of the groove 47 in which it is disposed (FIG. 2).

The engagement means provided on the decoupling member 46 for coupling it releasably to the coupling member 42 are formed by a plurality of axial tangs 64, referred to hereinafter for convenience as drive tangs, on the decoupling member 46 which are elastically deformable in the radial direction with, in the unstressed state, a free end 65 projecting from the outside periphery of the decoupling member 46.

In the unstressed state the free ends 65 of the drive tangs 64 extends over a circumference with diameter D3 slightly greater than that D2 of the inside periphery of the smaller diameter rectilinear section of the axial bush 15 of the coupling part 13 (FIG. 4A).

It is to be understood that the decoupling member 46 comprises a plurality of identical drive tangs 64 appropriately distributed in the circumferential direction.

They are in one piece with the decoupling member 46 that they equip and extend axially towards the drive bearing surface 44 from their root area on the decoupling member 46.

Since the coupling member 42 is a simple ring, as previously stated, each tang has an axial profile in the vicinity of its free end 65 which is at least in part complementary to that of the coupling member 42 and therefore circular, at least in part.

There are six drive tangs 64 and they alternate with axial lugs 67 formed by the corresponding main part of the decoupling member 46, from each of which they are separated laterally by slots 68.

Like the drive tangs 64, the lugs 67 are formed from a massive part 69 of the decoupling member 46 relative to which they extend axially beyond the free ends 65 of the drive tangs 64.

Thus the drive tangs 64 are wholly contained, in the axial direction, within the overall contour of the decoupling member 46.

Also, the frustoconical engagement bearing surface 62 of the decoupling member 46 is formed at the axial end of the lugs 67.

Thus the frustoconical engagement bearing surface 62 forms part of the decoupling member 46 which is distinct from the drive tangs 64 and extends axially between the free ends 65 of the drive tangs 64 and the drive bearing surface 44.

The decoupling member 46 has a transverse shoulder 70 in its median area at a distance from and facing axially towards the free ends 65 of the drive tangs 64.

This shoulder 70, which is on the outside periphery of the decoupling member 46, lies substantially in line with the root area of the drive tangs 64 and of the axial lugs 67 on the massive portion 69 of the decoupling member 46 so that the latter has a radial thickness greater than that in which the drive tangs 64 and the axial lugs 67 are formed.

Also, this shoulder is substantially frustoconical.

The thickening to which it contributes for one position of the decoupling member 46 advantageously strengthens the latter.

When, as shown here, the decoupling member 46 is molded from a synthetic material it comprises at its outside periphery, in line with the drive tangs 64, axial grooves 73 in the surface of its massive portion 69 to permit the punches adapted to form the free ends 65 of the drive tangs 64 to pass.

On the side axially opposite the drive bearing surface 44 the groove 47 in which the decoupling member 46 is mounted to move axially has a straight flank 75 reflecting the corresponding flank of the decoupling member 46.

At the root of its flank of which the drive bearing surface 44 forms part the groove 47 features a recess 76 the profile of which is adapted to allow the decoupling member 46 to enter it at least in part.

This profile is therefore substantially triangular, reflecting the corresponding profile of the decoupling member 46.

The recess 76 that the groove 47 thus features, in the manner of a simple pit merges with the drive bearing surface 44 and the drive part 25 of the clutch release bearing 10 comprises a cylindrical bearing surface 77 on its outside periphery that joins up with the free edge of the surface 44, leaving a sufficient thickness of material between it and the recess 76.

This cylindrical bearing surface itself communicates with a frustoconical engagement bearing surface 78 on the outside periphery of the drive part 25 at its free axial end.

The cylindrical bearing surface 77 of the drive part 25 which is level with the main part of the outside periphery of the latter has a diameter D4 which is slightly less than that D2 of the inside periphery of the smaller diameter section of the axial bush 15 of the coupling part 13 (FIG. 4A).

The coupling member 42 is fitted in advance into the retaining groove 43 formed between the coupling part 13 and the part 49 attached to it, occupying any axial position within the retaining groove 43 (FIG. 4A).

Similarly, the decoupling member 46 is fitted in advance into the groove 47 on the clutch release bearing 10 and occupies any axial position within this groove.

As shown in FIG. 4A, for example, it is assumed in what follows that the decoupling member 46 is in an advanced position in the groove 47 with its axial end comprising the frustoconical engagement bearing surface 62 inserted into the recess 76 at the root of the flank of the groove 47 of which the drive bearing surface 44 forms part.

To couple up the assembly the drive part 25 of the clutch release bearing 10 is inserted axially into the axial bush 15 of the coupling part 13, as represented schematically by the arrow F2 in FIG. 4A.

If the decoupling member 46 is in the advanced position at this time, as shown, the free ends 65 of the drive tangs 64 of the decoupling member 46 butt up against the frustoconical engagement bearing surface 19 of the coupling part 13 during this insertion (FIG. 4B) so that, immobilized in this way relative to the clutch release bearing 10, the decoupling member 46 moves in the groove 47 on the latter towards the axial end of the groove 47 opposite the drive bearing surface 44.

As axial insertion of the clutch release bearing 10 continues, the fustoconical engagement bearing surface 78 of the drive part 25 bears against the coupling member 42 (FIG. 4C) which constrains the latter to retract elastically into the retaining groove 43 on the coupling part 13.

At some stage (FIG. 4D) the drive part 25 of the clutch release bearing 10 once again entrains the decoupling member 46 through its axial end opposite the drive bearing surface 44, which constrains the drive tangs 64 of this member to enter the smaller diameter section of the axial bush 15 of the coupling part 13, the drive tangs 64 bending elastically in the radial direction towards the axis of the assembly.

As axial insertion of the clutch release bearing 10 continues, the cylindrical bearing surface 77 of the drive part 25 is inserted in the coupling member 42 (FIG. 4D).

It is to be understood that this phase may occur simultaneously with or before or after the previously described phase.

Once it has passed over the drive bearing surface 44, the coupling member 42 is released and tends to resume its initial retracted configuration in the groove 47 on the drive part 25 and, as shown in FIG. 4E, it then bears against the bottom of the groove 47.

Alternatively, it may equally well remain at a distance from the bottom of the groove.

It is to be understood that the coupling member 42 retracts as soon as the drive bearing surface 44 has passed over it.

As schematically represented by the clearance shown in FIG. 4E between the coupling member 42 and the drive bearing surface 44, axial insertion of the clutch release bearing 10 is deliberately extended by an overtravel so as to be sure that the drive bearing surface 44, which is part of the drive part 25 of the clutch release bearing 10, has actually passed beyond the coupling member 42 and that the latter, released because of this, has become inserted in the groove 47 in the drive part 25.

Because of the previous retraction of the coupling member 46 into the groove 47 caused by the drive tangs 64 and by virtue of the process described hereinabove, it is certain that, whatever the initial position of the decoupling member 46 in the groove 47, there is room in the latter for the coupling member 42 in the immediate vicinity of the drive bearing surface 44.

To achieve the required coupling it is then sufficient to reverse the axial movement of the clutch release bearing 10, as shown by the arrow F3 in FIG. 4F.

The drive bearing surface 44 on the drive part 25 of the drive member 20 of the clutch release bearing 10 then bears against the coupling member 42 and pushes the coupling member 42 back in the direction towards the flank 58 of the retaining groove 43, pressing it axially against the latter, to be more precise against its smaller cone angle frustoconical section 60.

The required coupling is thus achieved: if a traction force is applied to the clutch release bearing 10 by the control member 24 in the direction of the arrow F1 in FIG. 1, which corresponds to the arrow F3 in FIG. 4F, this traction force is transmitted to the clutch release device 11 through the drive bearing surface 44 of the coupling member 42 and the frustoconical bearing surface 60 of the flank 58 of the retaining groove 43 on the coupling part 13.

The axial movement that must be applied to the clutch release bearing 10, first in one direction and then in the other, to procure such coupling, may advantageously be communicated to it blind using the control member 24, the fingers 21 of the latter acting first on the lugs 36 on the cover 30 and then on the arms 34 of the cover 30 of which the lugs 36 form an extension.

The same applies to decoupling.

Figure 5A:
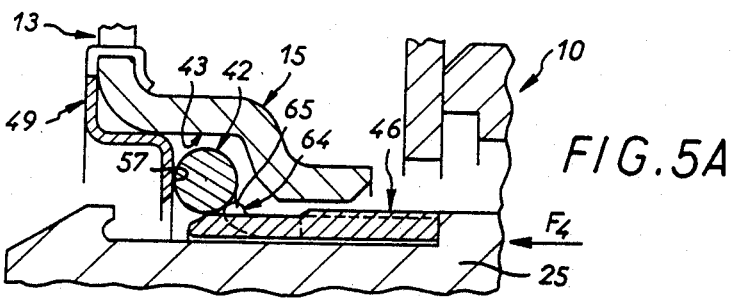
FIGS. 5A through 5E are views which, also analogous to that of FIG. 2, illustrate the decoupling of the clutch release bearing from the coupling part.

Initially the clutch release bearing 10 is again inserted axially into the bush 15 of the coupling part 13, in the direction of the arrow F4 in FIG. 5A, so that, pushed back by the decoupling member 46, the coupling member 42 butts up against the flank 57 of the retaining groove 43 and, axial insertion of the clutch release bearing 10 continuing, the decoupling member 46 is inserted into the coupling member 42, the latter deforming elastically in the radial direction.

Figure 5B:
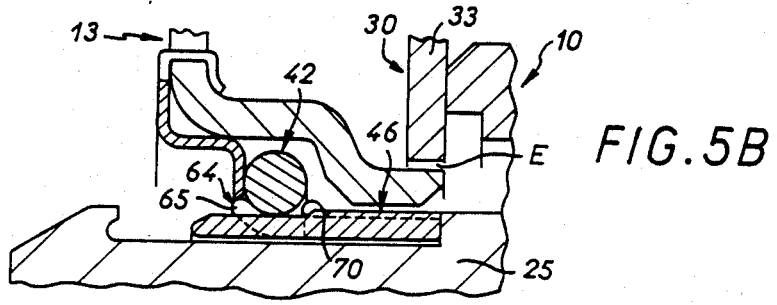

Initially limited to its axial end, this insertion of the decoupling member 46 into the coupling member 42 is then extended as far as the free end 65 of its drive tangs 64 through elastic deformation of the latter radially towards the axis of the assembly, the drive tangs 64 then returning elastically to their initial configuration after passing over the coupling member 42 (FIG. 5B).

The smaller diameter section of the axial bush 15 of the coupling part 13 is then inserted into the gap E between the upstanding edge 33 of the cover 30 and the drive part 25.

The coupling member 42 is then releasably coupled to the decoupling member 46, at least in the axial direction from the clutch release device 11 to the clutch release bearing 10, by the drive tangs 64 of the decoupling member 46.

Figure 5C:
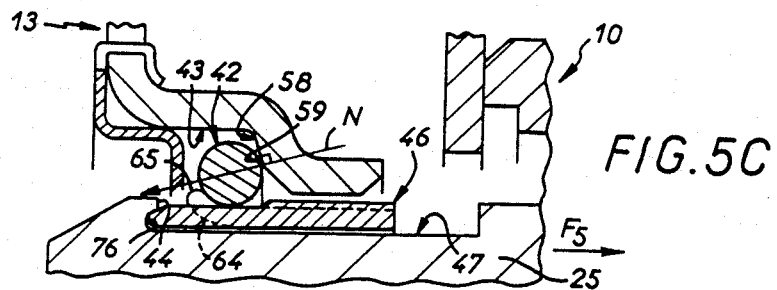

Thus if the clutch release bearing 10 is moved in the opposite axial direction, that of the arrow F5 in FIG. 5C, the flank of which the drive bearing surface 44 forms part of the groove 47 in the drive part 25 of the clutch release bearing 10 entrains the assembly comprising the decoupling member 46 and the coupling member 42 interlocked with it until, as shown, the coupling member 42 butts up against the flank 58 of the retaining groove 43 in the coupling part 13 opposite the drive bearing surface 44.

When the coupling member 42 is interlocked in this way with the decoupling member 46 it is through the larger cone angle frustoconical bearing surface 59 of the flank 58 that the drive part 13 bears on the coupling member 42.

By design, the cone angle of the frustoconical bearing surface 59 is such that, when, as shown, the decoupling member 46 is butted up against the flank of the groove 47 of which the drive bearing surface 44 forms part, the normal N to this frustoconical bearing surface 59 is spaced from the associated engagement means and therefore from the free end 65 of the drive tangs 64 of the decoupling member 46.

This normal N is also spaced from the groove 47.

If the axial movement of the clutch release bearing 10 is continued (FIG. 5D) the result is that the force exerted on the coupling member 42 by the drive part 25 causes the coupling member 42 to be released from the decoupling member 46.

Figure 5D:
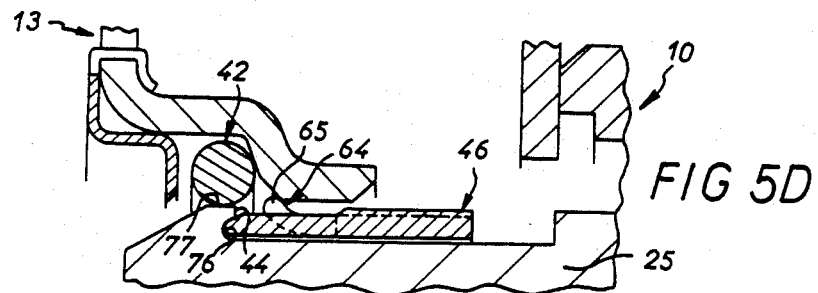

It is then obliged to come into contact with the cylindrical bearing surface 77 on the drive part 25 of the clutch release bearing 10 (FIG. 5D).

Bringing the coupling member 42 into contact with the cylindrical bearing surface 77 is facilitated by the fact that, by virtue of the insertion of the decoupling member 46 into the recess 76 provided in the groove 47 at the base of the drive bearing surface 44, the gap separating the free ends 65 of the drive tangs 64 of the decoupling member 46 axially from the cylindrical bearing surface 77 is advantageously reduced and by the fact that the aforementioned normal N is also spaced from the groove 47.

Figure 5E:
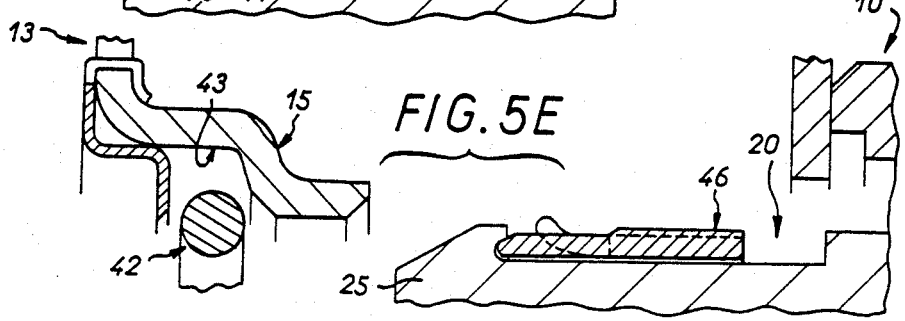

As axial movement of the clutch release bearing 10 is continued, the coupling member 42 then escapes from the drive part 25 (FIG. 5E).

The required decoupling is thus achieved.

However, recoupling is possible by means of the process previously described.

Thus it is possible in accordance with the invention to achieve such coupling and such decoupling in a reversible manner.

Each time the coupling member is releasably coupled to the decoupling member according to the process described, followed by their decoupling, and this coupling is equally adapted to driving of the assembly in the axial direction from the clutch release device of the clutch concerned to the clutch release bearing as in the opposite axial direction, even if it is operative only in the first of these directions.

Figure 6:
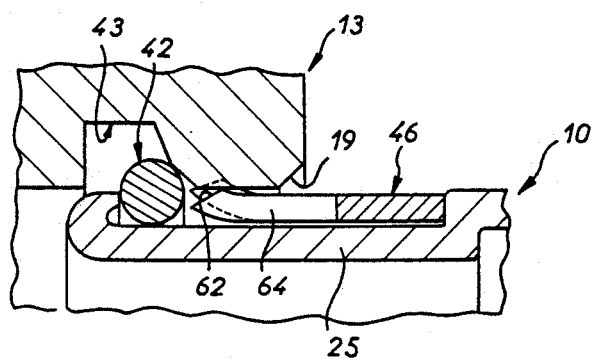
FIGS. 6 and 7 are partial views in axial cross-section, also analogous to that of FIG. 2, each relating to a respective alternative embodiment.

In the alternative embodiment schematically represented in FIG. 6, the frustoconical engagement surface 62 of the decoupling member 46 forms part of the free end of its drive tangs 64.

The corresponding portion of the decoupling member 46 is reduced to these drive tangs 64, without any axial lugs of any kind between them.

The drive tangs 64 are adapted to pass elastically from a deployed configuration, which is schematically represented in chain-dotted line in the figure and in which they are adapted to butt up against the frustoconical engagement bearing surface 19 of the coupling part 13 during axial insertion into the latter of the drive part 25 of the clutch release bearing 10, to a retracted configuration which is shown in full line in the figure and in which they are adapted to be inserted into the coupling member 42 in order for the latter to be deployed as is necessary to achieve decoupling by the process previously described.

Instead of being machined from the solid, the drive part 25 is appropriately shaped from sheet metal.

Instead of being appropriately shaped from sheet metal, the coupling part 13 is machined from the solid.

Figure 7:
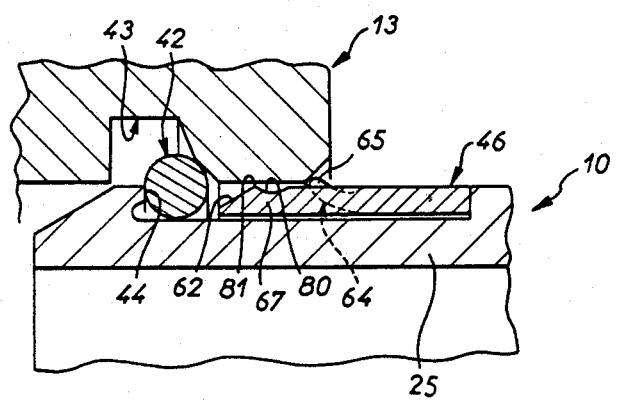

The same is true of the embodiment shown in FIG. 7.

In this embodiment the engagement means provided to permit releasable coupling of the decoupling member 46 to the coupling member 42 are formed by an annular groove 80 on the outside periphery of the decoupling member 46.

The groove 80 preferably, although this is not essential, has a profile that is at least in part complementary to that of the coupling member 42, and therefore at least in part circular.

As an alternative, it may have a different, for example four-sided, profile.

Although the frustoconical engagement bearing surface 62 of the decoupling member 46 then merges directly with the groove 80, via an edge 81, a cylindrical bearing surface may also be provided between it and the latter.

As previously, the decoupling member 46 has a plurality of axial drive tangs 64 which are elastically deformable in the radial direction and the free ends 65 of which, in the unstressed condition, project radially from its outside periphery.

The free ends 65 of the drive tangs 64 are spaced axially from the groove 80, extending from the side of this groove opposite the drive bearing surface 44.

The drive tangs 64 are, as previously, in one piece with the decoupling member 46, alternating with its axial lugs 67, and are in the axial direction entirely contained within the overall contour of the decoupling member 46.

The functioning of this embodiment is in all respects similar to that previously described.

However, when the coupling member 42 is interlocked with the decoupling member 46 it is radially inserted into the groove 80 of the latter.

The present invention is not limited to the embodiments described and shown but encompasses any variant execution and/or combination of their various component parts.

In particular, instead of the decoupling member having a slot for mounting on the drive part, it may have notches uniformly spaced around each of its axial edges, the notches on one axial edge circularly alternating, and axially overlapping the notches on the other axial edge.

There is claimed:

1. Clutch release bearing assembly comprising a clutch release bearing including a drive part, and a coupling part adapted to be attached to a clutch release device of a clutch and to couple such a clutch release device to said clutch release bearing, an annular retaining groove on said coupling part, fastening means operative in traction and between said coupling part and said drive part for coupling said coupling and drive parts together in an axial direction away from the clutch release device and towards said clutch release bearing, said fastening means comprising a radially elastically deformable annular coupling member partly engaged in said annular retaining groove, and a substantially transverse drive bearing surface on said drive part, said drive bearing surface being adapted to bear axially against said coupling member in said axial direction, another groove in said drive part, and an annular decoupling member adapted to decouple said clutch release bearing from the clutch release device, said decoupling member being axially movable in said other groove, said other groove having one transverse flank on which is defined said drive bearing surface, said decoupling member having engagement means for releasably coupling said decoupling member to said coupling member in the course of decoupling of said parts to permit movement of said coupling member with said decoupling member in said axial direction, said engagement means comprising at least one radially elastically deformable axial drive tang on said decoupling member having a free end radially outward of the periphery of said decoupling member.

2. Clutch release bearing assembly according to claim 1, wherein said coupling member is a ring and said at least one drive tang has in the vicinity of its free end an axial profile at least partly complementary to that of said coupling member.

3. Clutch release bearing assembly according to claim 1, wherein said decoupling member has a transverse shoulder at a distance from the free end of said at least one drive tang facing axially towards said free end.

4. Clutch release bearing assembly according to claim 1, wherein said decoupling member has a frustoconical engagement bearing surface on its outside periphery at an axial end adjacent said drive bearing surface.

5. Clutch release bearing assembly according to claim 4, wherein said frustoconical engagement bearing surface is part of a portion of said decoupling member distinct from said at least one drive tang and extending axially beyond the free end of said at least one drive tang towards said drive bearing surface.

6. Clutch release bearing assembly according to claim 4, wherein said frustoconical engagement bearing surface is part of the free end of said at least one drive tang.

7. Clutch release bearing assembly according to claim 1, wherein said at least one drive tang is in one piece with said decoupling member.

8. Clutch release bearing assembly according to claim 1, wherein said at least one drive tang lies entirely within the axial limits of the rest of said decoupling member.

9. Clutch release bearing assembly according to claim 1, wherein said decoupling member comprises a plurality of circumferentially spaced drive tangs.

10. Clutch release bearing assembly according to claim 1, wherein said other groove comprises at the root of said one flank a recess for receiving at least part of said decoupling member.

11. Clutch release bearing assembly according to claim 10, wherein said recess is substantially triangular in axial section and said drive part comprises a cylindrical bearing surface adjoining said drive bearing surface remote from said recess.

12. Clutch release bearing assembly according to claim 1, wherein said retaining groove has a flank axially remote from said one flank on said drive part, said retaining groove flank having a frustoconical bearing surface, said coupling member bearing on said frustoconical bearing surface when said coupling member is in engagement with said decoupling member, said frustoconical bearing surface having a cone angle such that a normal to said frustoconical bearing surface at a zone of contact of said coupling member when said decoupling member abuts said one flank is spaced from said engagement means.

13. Clutch release bearing assembly according to claim 12, wherein said normal is also spaced from said other groove.

14. Clutch release bearing assembly according to claim 12, wherein said retaining groove includes another frustoconical bearing surface having a smaller cone angle than that of the first mentioned frustoconical bearing surface, said coupling member being adapted to bear on said other frustoconical bearing surface when said coupling member is in engagement with said drive bearing surface.

15. Clutch release bearing assembly according to claim 12, further comprising a part separate from but attached to said coupling part, one of said flanks of said retaining groove facing axially in the same direction as said drive bearing surface being formed on said separate part.

16. Clutch release bearing assembly according to claim 1, wherein said drive part comprises a free end facing the clutch release device having a frustoconical engagement bearing surface.

* * * * *